Sept. 1, 1953 H. M. VEAUX 2,650,949
SYSTEM OF CHANGING THE FREQUENCY BAND
OCCUPIED BY A TELEPHONIC TRANSMISSION
Filed July 29, 1949 3 Sheets-Sheet 1

INVENTOR.
Henri Maurice Veaux
BY [signature]
AGENT

INVENTOR.
Henri Maurice Veaux
BY Fred M Vogel
AGENT

INVENTOR.
Henri Maurice Veaux
BY
AGENT

Patented Sept. 1, 1953 2,650,949

UNITED STATES PATENT OFFICE 2,650,949

SYSTEM OF CHANGING THE FREQUENCY BAND OCCUPIED BY A TELEPHONIC TRANSMISSION

Henri Maurice Veaux, St. Leu la Foret, France

Application July 29, 1949, Serial No. 107,424
In France July 9, 1948

1 Claim. (Cl. 179—15.55)

The present invention relates to systems for changing the frequency band occupied by a telephonic transmission. The system may include a delay line having a plurality of taps for storing and duration-conversion of signals or the same result may be obtained by substituting for the delay line associated with an electronic switch a tube for storing signals of the iconoscopic type or having a mosaic insensitive to the photo-electric effect.

Figure 1:
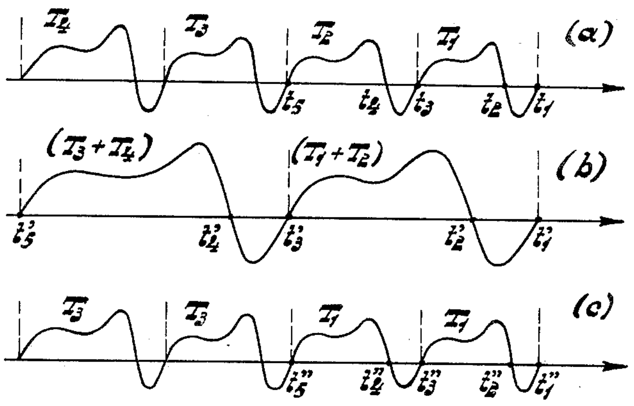
Figure 2:
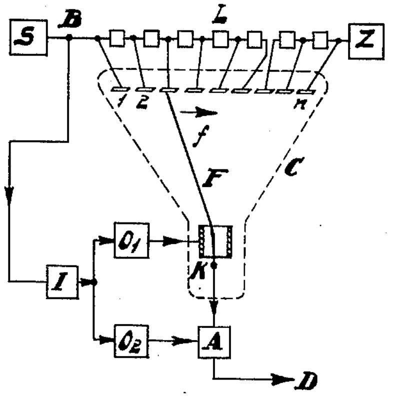
Figure 3:
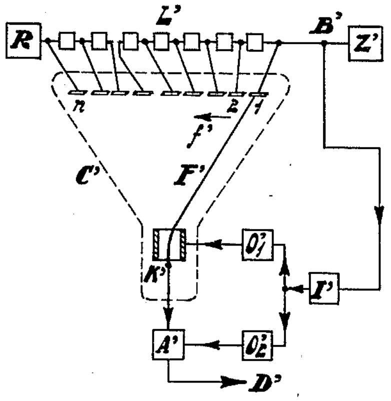
Figure 4:
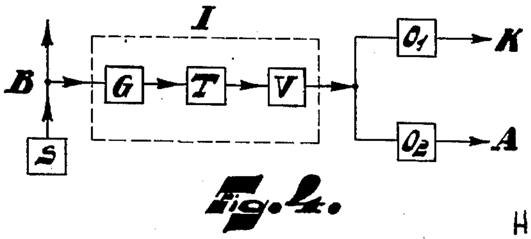
Figure 5:
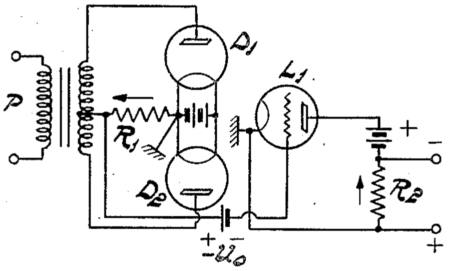
Figure 6:
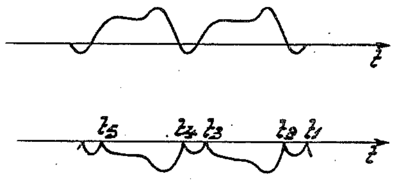
Figures 7, 8, 9:
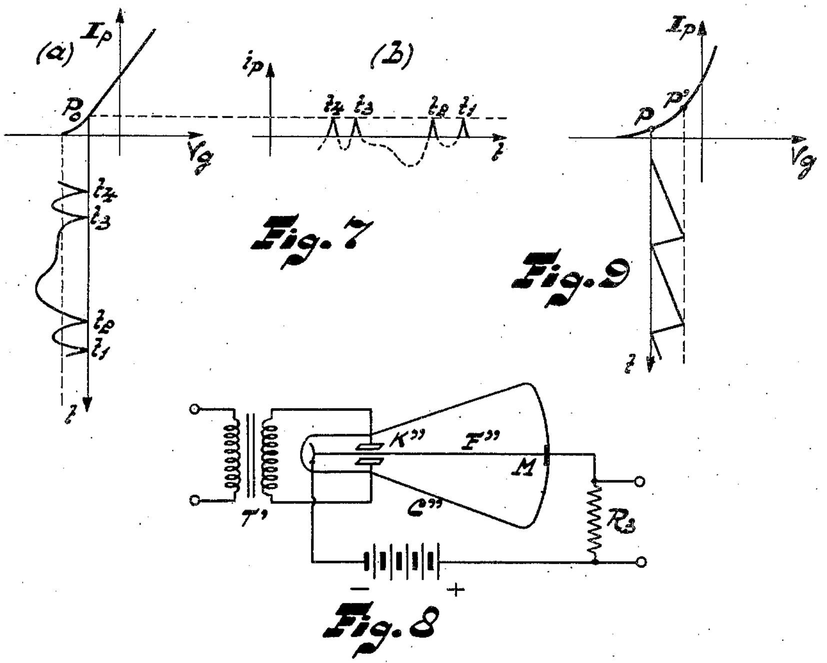
Figure 10:
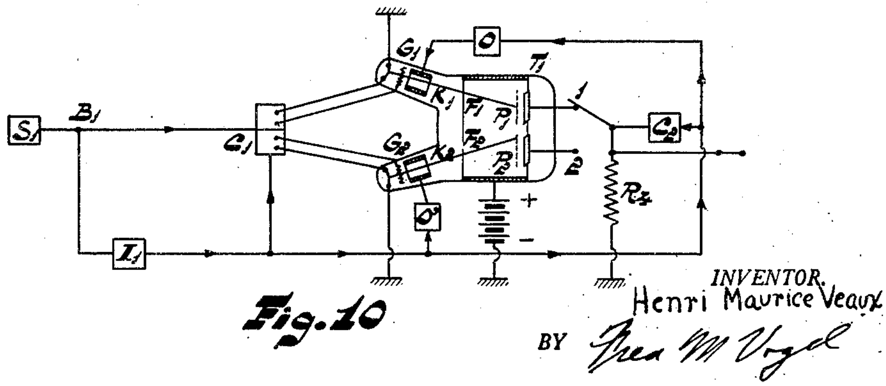
Figure 11:
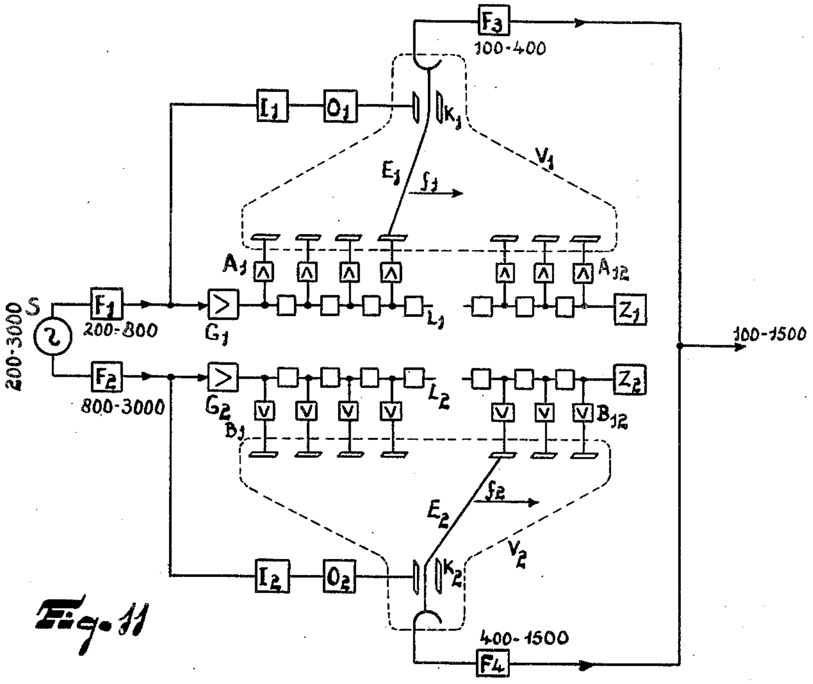
Figure 12:
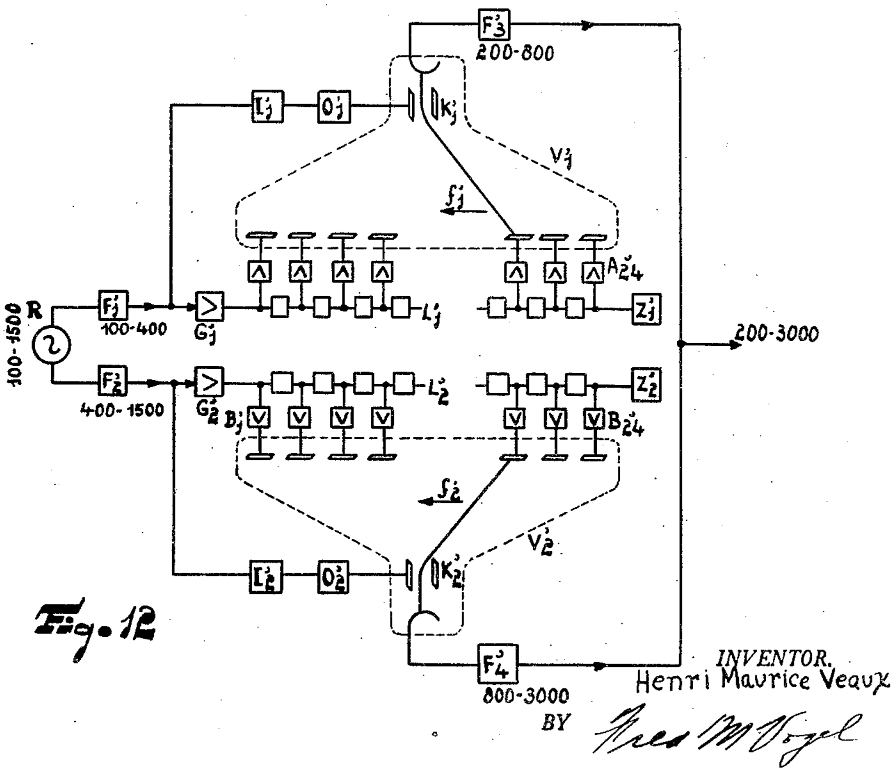

For a full understanding of the invention reference is had to the following detailed description thereof to be read in connection with the accompanying drawing wherein:

Fig. 1 contains curves illustrative of the theory underlying the present invention, Fig. 2 is a block diagram of a transmitter for telephonic signalling in accordance with the invention, said transmitter making use of a delay line, Fig. 3 is a block diagram of a receiver in accordance with the invention adapted to cooperate with the transmitter in Fig. 2, Fig. 4 is a more detailed block diagram of an arrangement within the transmitter shown in Fig. 2, Fig. 5 is a schematic circuit diagram of an element contained in Fig. 4, Fig. 6 is a diagram of a voltage developed in the circuit of Fig. 5, Fig. 7 is a diagram of another voltage developed in the circuit of Fig. 5, Fig. 8 is the schematic diagram of a circuit used in conjunction with the arrangements in Figs. 2 and 3, Fig. 9 is a voltage curve developed by element A in Fig. 2, Fig. 10 is the schematic diagram of a second embodiment of the invention making use of an iconoscope, Fig. 11 is a block diagram of a carrier telephony transmitter in accordance with the invention, and Fig. 12 is a block diagram of a carrier telephony receiver intended to cooperate with the system shown in Fig. 11.

Experience shows that in telephonic transmission the successive current periods change slowly so that two or more successive periods are substantially identical. With this factor in mind a system for reducing the frequency band occupied by a telephonic transmission consists:

1. At the transmitter—
   - (a) In abstracting characteristic signal periods at time intervals comprising the same whole number of periods;

- (b) In extending, by adequate duration conversion, each characteristic period so as to obviate any interruption of continuity in the transmission;
2. At the receiver—
   - (a) In restoring the characteristic period to its original duration by duration conversion in the reverse manner to that employed at the transmitter;
   - (b) In re-establishing the continuity of the signals at the receiver by a repetition of the characteristic period.

Fig. 1 shows the operations effected at the transmitter when suppressing one period out of every two: the even periods $T_2$, $T_4$ and so forth are suppressed one out of every two and the signals of the odd periods $T_1$, $T_3$ and so forth are extended into the times $(T_1+T_2)$, $(T_3+T_4)$ and so forth adjacent $2T_1$, $2T_3$ and so forth. The inverse operation effected at the receiver consists in realizing, from the periods $2T_1$, $2T_3$ and so forth, re-establishment of the periods $T_1$, $T_3$ and so forth which are repeated in the free intervals so as to obtain signals closely resembling the original signals; the elements determining the form of the characteristic periods expanded at the transmitter may otherwise be extracted from both the periods $(T_1, T_2)$, $(T_3, T_4)$, and so forth.

The present invention has for its first object to realize the aforesaid system by the use of a delay line having a plurality of taps in view of the storage and the duration conversion of the signals.

Referring now to Fig. 2, it will be seen that at the transmitter the source of telephonic currents S is connected to a delay line terminated in its characteristic impedance Z. A plurality of taps arranged between the various sections are connected to electrodes 1, 2, . . . $n$ of an electronic switch C. These electrodes may be aligned, for example, on a straight line and scanned by an electron beam F which is given a desired scanning movement under the influence of a saw-tooth voltage applied to the deflection electrodes K and supplied by a relaxation oscillator $O_1$ which is controlled by pulses delivered by a source I in accordance with the period and the phase of the telephonic currents obtained at the point B, as will be described more fully hereinafter. When scanning the electrodes, pulses are abstracted which determine, with the desired duration-conversion, the form of the signals passing through the line L. Assuming that it is required to realize the transformation indicated in Fig. 1 for the transmitter, the source I, at the instant $t_1$ corresponding to a zero value of the input signal at the point B, delivers a pulse which by acting on the oscillator $O_1$ brings about the uniform scanning movement of the beam F in the direction of the arrow $f$ from the electrode 1. The scanning speed is adjusted to half the speed of flow of the current in the line L; thus the frequency of the output current of the amplifier A is half the input frequency (duration-conversion in the ratio 0.5). The source I is arranged so that a pulse is delivered only at the zero values of the current at B which are spaced apart by two periods. Under these conditions, from the instant $t_1$ to the instant $t_5$, that is to say for a time interval $(T_1+T_2)$, the beam F scans the electrodes of the switch with uniform movement and at the output of A a reproduction of the period $T_1$ of the signals at B, extended to the time interval $(T_1+T_2)$, that is to say $2T_1$, is obtained. At the instant $t_5$ a new pulse supplied by I causes the beam F to fly back substantially instantaneously to the origin 1 of the electrodes for renewed scanning resulting in extension of the period $T_3$ into the time $(T_3+T_4)$. The line L must be proportioned for storing two successive periods, that is to say a sequence of signals not exceeding in practice 8 milli-seconds. A number of electrodes equal to 40 renders it possible to define a period $T_1$, extended to the interval $(T_1+T_2)$ at the rate of 10,000 pulses per second, which is a perfectly sufficient rate. In view of the attenuation of the signals during their flow through line L, a compensation is required to be established by adjustment of the amplification of A with the use of the pulses supplied by the source I. The pulse supplied by the source I initiates simultaneously the scanning movement of the beam F by acting on the oscillator $O_1$ and the variation in amplification of the amplifier A by acting on a relaxation oscillator $O_2$ which alters the slope of the amplifying tube in accordance with the compensating law.

Referring now to Fig. 3, the receiver R supplies the transformed telephonic currents to a delay line L′ terminated in its characteristic impedance Z′. A plurality of taps arranged between the various sections are connected to the electrodes 1, 2 . . . $n$ of an electronic switch C′. These electrodes may be aligned, for example, on a straight line and scanned by an electron beam F′ under the influence of the sawtooth voltage supplied to the deflection electrodes K′ from a relaxation oscillator $O_1'$ which is controlled by pulses delivered by a source I′ in accordance with the frequency and the phase of the telephonic currents obtained at the point B′, as will be described more fully hereinafter. When scanning the electrodes, pulses are abstracted which determine, with the desired duration-conversion, the form of the currents passing through the line L′. Assuming that it is required to realize the transformation shown in Fig. 1 at the receiver (current flow shown at (*b*) into the current flow at (*c*)): at the instant $t'$ corresponding to a zero value of the output signal at the point B′ the source I′ delivers a pulse which, by acting on the relaxation oscillator $O_1'$, brings about the uniform scanning movement of the beam F′ in the direction of the arrow $f'$ (direction opposite to that of the flow of the signals) from the electrode 1. The scanning speed is adjusted so as to be equal in absolute value to that of the flow of the signals in the line L′. Thus the frequency of the output current of the amplifier A′ is double the input frequency (duration-conversion in the ratio 2); the source I′ is so arranged that a pulse is delivered only at the zero values of the current at B′ which are spaced apart by two periods. In these circumstances, from the instant $t_1'$ to the instant $t_5'$, that is to say for a time interval $(T_1+T_2)$, the beam F′ scans the electrodes of the switch with uniform movement and at the output of A′ a reproduction of the two periods shown in Fig. 1(*b*) and compressed into the time between the instants $t_1''$ and $t_5''$ shown in Fig. 1(*c*) is obtained. At the instant $t_5'$ a new pulse supplied by I′ causes the beam F′ to fly back substantially instantaneously to the origin 1 of the electrodes, for renewed scanning; during the first scanning the signal period comprised between $t_3'$ and $t_5'$ has passed through the line L′ till it has reached the origin 1 of the electrodes: during the second scanning the same signal period is subjected to renewed scanning. The line L′ must be proportioned for storing the largest possible of the periods $t_1'$, $t_3'$ that is to say a sequence of equal signals equal in practice to 8 milli-seconds (the period $t_1$, $t_3$ of the original signals does not exceed 4 milli-seconds). A number of electrodes equal to 80 renders it possible to conveniently define the two signal periods of a single scanning at the rate of 10,000 pulses per second. In view of the attenuation of the signals during their flow through the line L′ a compensation is required to be established by adjustment of the amplification of A′ with the use of the pulses supplied by the source I′ to the relaxation oscillator $O_2'$ which alters the slope of the amplifying tube in accordance with the compensating law. However, it is pointed out that there is a compensation of the attenuation in L at the transmitter by the opposite attenuation in L′ at the receiver: at the transmitter the attenuation increases in accordance with the cycle of a scanning. The result follows an opposite law at the receiver. It is also noted that it is in no sense necessary that the instants at which the scannings start at the electrodes 1 at the transmitter and at the receiver should coincide exactly with a zero value, at the same instant, of the current through the said electrode because of the periodical nature of the signals in the time intervals under consideration.

The manner in which the scanning of the electrodes and the amplification at the transmitter are controlled is shown in the diagram of Fig. 4 and the principle underlying it is again identical with that at the receiver; similar operations are to be effected in succession:

(1) Any zero value of the current at B sets up a characteristic pulse by way of a source of pulses G;

(2) The pulses delivered by G exhibit a different shape and may be subjected to regeneration through a regenerator T;

(3) The identical transmissions from T are counted in the counter V which for each sequence of four pulses received from T, supplies a single pulse operative to control the relaxation oscillators $O_1$ and $O_2$.

The first operation (production of pulses for the zero values of the current) may be effected on two different lines:

(1) The two half-waves of the telephonic current are rectified (Fig. 5); the latter passes through the primary P of a transformer the secondary of which supplies two diodes $D_1$ and $D_2$ which are connected in parallel and in opposite senses. The voltage abstracted at the terminals of a resistance $R_1$ exhibits the shape shown in Fig. 6 and this voltage is applied to the grid of an amplifying valve in superposition on the bias voltage $U_0$ corresponding to the position $P_0$ of the working point on the anode current/grid voltage characteristic curve (Fig. 7(*a*)); at the instants $t_1$, $t_2$, $t_3$, $t_4$ and so forth corresponding to a zero value of the telephonic current the anode circuit of the valve $L_1$ has set up across it a current pulse as shown in Fig. 7(*b*); a voltage of the same shape is abstracted at the terminals of the resistance $R_2$;

(2) The telephone signals abstracted either at B (Fig. 2) or at B' (Fig. 3) are applied (Fig. 8), by way of a transformer T' to the deflection electrodes K'' for deflecting the beam F'' of a cathode ray tube C''; this beam produces a current pulse when passing, at a zero value of the voltage, over an output electrode M; the pulse is abstracted across the terminals of $R_3$.

In either of the two methods the pulses obtained are not identical since in the first case the current form is not the same in the neighbourhood of the various zero values and for the same reason in the second case the length of time for which the beam F'' passes over the electrode M varies; it is therefore preferable, although not imperative, to proceed with a regeneration of the pulses before supplying the pulse counter which has for its function to supply the final pulses. For this purpose the classic method is employed: each pulse delivered by the valve $L_1$ (Fig. 5) controls the discharge of a thyratron and thus supplies a uniform output pulse.

The construction of the pulse counter V is in agreement with any of the classic solutions. According to one solution each pulse received increases the charge of a condenser until a voltage is obtained which by the use of a limiter brings about a discharge by which a pulse is produced. According to a further well-known solution, the pulse counter comprises four series-connected thyratron tubes arranged in such manner that a pulse received from T makes a triode conducting, brings about disconnection of the preceding triode and prepares the operation of the following triode; the first sequence of four pulses starts up in succession the four thyratrons the latter of which supplies one output pulse to four input pulses.

The pulses originating from the pulse counter V act simultaneously on the relaxation oscillators $O_1$ and $O_2$ which produce a sawtooth voltage. The construction of these oscillators of well-known type needs no further explanation. The voltage supplied from $O_1$ to the deflection plates K brings about the scanning movement of the beam F whose scanning speed is adjusted to the desired value without difficulty. The sawtooth voltage obtained at the output of $O_2$ is applied to the grid of the pentode of the amplifying stage A having an output coupling of the resistance type. The working point is thus displaced (Fig. 9) between the two positions P and P' on the anode current/control grid voltage characteristic curve. The slope, and hence the amplification, of the valve thus vary so as to balance the attenuation of the signals when passing through the line L. In fact this attenuation follows an exponential law which may be compensated more exactly either by selecting a valve the slope of which increases according to an exponential law within the limits of variation under consideration or by utilising an oscillator $O_2$ the output voltage of which varies according to an exponential law.

It is obvious that the system is suited for the case in which at the transmitter one period to three, one period to four, and so forth is abstracted but evidently it is necessary to alter accordingly the construction of the delay lines and the characteristics of the scanning members and of the members for balancing the attenuation in the lines. If, for example, one period to three is abstracted, the lines L and L' correspond to a time lag equal to three periods the duration of each of which is equal to the permissible maximum of a telephonic period (that is to say to a total of 12 milli-seconds). The beams F and F' (Figs. 2 and 3) scan the electrodes at speeds which are equal respectively to the third part and to three times the speed of flow of the currents in the lines L and L'.

The comparatively high number of electrodes of the switches C (Fig. 2) and C' (Fig. 3) is not necessary for defining the lower components of the band but is imperative for defining the components of higher frequency. In order to reduce the said number the components may be separated, by filtering in two or more channels, if desired with transposition and/or inversion and the general principle underlying the present specification may be applied to each channel individually on the only condition that at the receiver the initial order of the frequencies should be restored. A system of secrecy is otherwise realised in this manner by effecting on each channel abstractions of characteristic periods separated by a different and adjustable number of periods.

The present invention is also concerned with a solution by different means of the same problem of reducing the pass band occupied by a telephonic transmission. According to this solution, in order to realize the duration-conversions, the assembly of the delay line associated with an electronic switch is substituted by a tube for signal storage of the iconoscope type or of a similar type: the characteristic periods selected at the transmitter from the telephonic signals and the periods whose duration is converted at the receiver are inscribed on the mosaic of an iconoscope by the use of a modulated electron beam, this inscription being followed by reading by the same beam at a speed which ensures the desired duration-conversion. The speeds of scan-reading the signals are chosen to allow for the fact that the signals inscribed on a mosaic are stationary, whereas they propagate in a delay line. Fig. 10 is a diagram of the arrangement used at the transmitter: an iconoscope tube $T_1$ having two guns and two mosaics ($P_1$ and $P_2$) equivalent to the total of two tubes having a single gun serves for inscription and reading of the signals originating from the telephonic source $S_1$. A commutator $C_1$ ensures the interchange of the inscription function and the reading function of the two beams $F_1$ and $F_2$. A further commutator $C_2$ switches the output resistance $R_4$ over from either of the positions 1 and 2 corresponding to the mosaic subjected to the reading of inscribed signals to the other; the signals of Fig. 1(*a*) are transformed into those of Fig. 1(*b*) as follows: from the instant $t_1$ to the instant $t_5$ the commutator $C_1$ sends the signals originating from $S_1$ back to the grid $G_1$ which directs the beam $F_1$ producing the inscription on the mosaic $P_1$. At the same time the commutator $C_2$ passes the signals of the reading of the preceding inscription effected at $P_2$ to the output resistance $R_4$ (output position 2); the control of the commutations and the scanning movements of the beams $F_1$ and $F_2$ is effected, in accordance with a method similar to that described with reference to the first solution, from the telephonic signals at the input $B_1$ of the system; the member $I_1$, similar to the member I of Fig. 2, delivers pulses which control simultaneously the commutations of $C_1$ and $C_2$ and the scanning movements of the beams $F_1$ and $F_2$ by way of the relaxation oscillators O and O'. Only the inscription of the period $t_1$ and $t_2$ is useful for the reading. The speed of scan-reading is fixed at half the value of that of the inscription scanning so that the portion of an inscribed line which is subjected to reading is limited to the inscription made in the period comprised between $t_1$ and $t_3$. The signals of Fig. 1(*b*) are transformed at the receiver into those of Fig. 1(*c*) by an inverse method with repetition of the signals corresponding to an inscription period. This repetition may be obtained by different experimental methods: according to one of these methods the inscription is made by a very thin beam of appreciable height serving for reading by a small-sized beam scanning in succession the two portions of the inscription band; a further method consists in realizing the inscription by the use of two beams tracing parallel lines modulated by the same signals, the reading being effected by successive scanning of the two identical inscription lines.

As indicated hereinbefore, when using a delay line it is possible to obtain an appreciable simplification, if the frequency band required to be transmitted is passed over a plurality of channels. In this case the telephonic band of from 200 to 3000 cycles/sec. is split into two or more bands to which the above method is applied: at the transmitter (Fig. 11) the source S supplies, by way of two amplifiers $F_1$ (from 200 to 800 cycles/sec.) and $F_2$ (from 800 to 3000 cycles/sec.), two systems of the above type comprising delay lines $L_1$ (10 milli-sec. for the band 200 to 800 cycles/sec. with 12 tappings) and $L_2$ (2.5 milli-sec. for the band 800 to 3000 with 12 tappings) and switches $V_0$ and $V_2$ having 12 electrodes; each of the systems scans one frequency band. By reason of the comparatively low number of electrodes the amplification compensation to allow for the attenuation in the lines $L_1$ and $L_2$ may be effected by adjustment of the amplifications of the amplifiers $A_1$ to $A_{12}$ and $B_1$ to $B_{12}$. A symmetrical system is used at the receiver (Fig. 12) where the receiver R supplies two systems.

A reduction of the material with respect particularly to the delay lines is obtained by proceeding with a preliminary transposition of the frequency band between 3200 and 6000 cycles/sec. for example; the periodic variation of the currents is thus emphasized (which permits of abstracting the characteristic periods from longer period intervals and of reducing the band occupied) and the importance of the delay line is considerably decreased. For the above-mentioned band ranging between 3200 and 6000 cycles/sec. one abstraction to every three periods limits the output band between 1070 cycles/sec. and 2000 cycles/sec. (band width 930 cycles/sec.). The delay line at the transmitter (where the scanning speed of the beam is one third of the speed of travel of the signals in the line) must permit of storing two periods of the lower limit of the frequencies. It consequently corresponds to a time delay of about 0. milli-sec. The number of electrodes of the switch must permit of conveniently defining the shortest period ($\frac{1}{6}$ milli-sec.), which for five pulses per output current period corresponds to 10 electrodes used altogether for the lowest frequency (3200). The delay line at the receiver (where the scanning speed of the beam is opposed to and double in absolute value to that of the flow of the currents in the delay line) must also permit of storing two periods of the lower limit of the frequencies (total time delay of 0.7 milli-sec.). But the number of electrodes must be sufficient to define three periods per scanning, which leads to 30 electrodes used altogether by the frequency of 3200; the number of electrodes must be sufficient to permit to differentiate, in a small number of periods, between the various frequencies of the band to be transmitted.

A further solution consists in splitting the band 200 to 3000 into two bands ranging respectively between 200 and 1500 and 1500 to 3000, in transposing the first band between 3200 and 4500 and in applying the principle underlying the present specification to two bands limited between (1500 and 3000) and (3200 and 4500), the opposite operations of transposition being effected at the receiver.

What I claim is:

In a communication system; apparatus for transmitting pseudo-periodical input signals characterized by a slow and continuous modification of a period, whereby successive periods are substantially identical, comprising a duration-conversion mechanism providing a desired rate of division, means to apply the input signals to said mechanism, a control device responsive to the input signals for initiating the operation of said mechanism and including means to produce a pulse for any zero value of the input signals, means for counting the pulses to produce one output pulse for a number of counted pulses determined by the desired rate of division and means to apply said output pulses to said mechanism to initiate its operation to produce output signals corresponding to the extension of the original signals in the time occupied by the suppressed periods resulting from the repetition of the same period, said mechanism including a delay line having a plurality of spaced taps thereon, said line terminating in its characteristic impedance, an electronic switch including a plurality of electrodes, an electron beam source and means to deflect said beam to scan said electrodes successively, means to apply a periodic deflection voltage to said deflection means, and means to control said deflection voltage in accordance with the output pulses from said control device.

HENRI MAURICE VEAUX.

References Cited in the file of this patent

UNITED STATES PATENTS

| Number | Name | Date |
|---|---|---|
| 1,671,143 | Campbell | May 29, 1928 |
| 2,115,803 | Dudley | May 3, 1938 |
| 2,176,526 | Friend | Oct. 17, 1939 |
| 2,219,021 | Riesz | Oct. 22, 1940 |